(12) United States Patent
Adams

(10) Patent No.: US 9,004,515 B2
(45) Date of Patent: Apr. 14, 2015

(54) TRANSMISSION ASSEMBLY FEATURING ONE-WAY NEEDLE BEARINGS FOR ENGINE- AND HUMAN-POWERED VEHICLES

(71) Applicant: Jeffery Curtis Adams, Belmont, WI (US)

(72) Inventor: Jeffery Curtis Adams, Belmont, WI (US)

( * ) Notice: Subject to any disclaimer, the term of this patent is extended or adjusted under 35 U.S.C. 154(b) by 47 days.

(21) Appl. No.: 13/795,687

(22) Filed: Mar. 12, 2013

(65) Prior Publication Data

US 2014/0274517 A1  Sep. 18, 2014

(51) Int. Cl.
*B62M 1/00* (2010.01)
*B62M 3/00* (2006.01)
*B62M 23/00* (2006.01)
*B62M 1/36* (2013.01)

(52) U.S. Cl.
CPC .............. *B62M 3/003* (2013.01); *B62M 23/00* (2013.01); *B62M 1/36* (2013.01)

(58) Field of Classification Search
CPC ........ B62M 3/003; B62M 1/36; B62M 23/00; B62M 6/20
USPC ......................................................... 280/259
See application file for complete search history.

(56) References Cited

U.S. PATENT DOCUMENTS

| 4,397,369 | A | | 8/1983 | Read | |
|---|---|---|---|---|---|
| 4,793,208 | A | * | 12/1988 | Bregnard et al. | ............ 74/594.2 |
| 4,966,380 | A | * | 10/1990 | Mercat | ......................... 280/259 |
| 5,361,863 | A | | 11/1994 | Goodwin | |
| 6,199,449 | B1 | * | 3/2001 | Harrington | .................. 74/594.1 |
| 7,284,463 | B2 | | 10/2007 | DeCelles et al. | |
| 7,770,682 | B2 | | 8/2010 | Spanski | |
| 8,051,937 | B2 | | 11/2011 | Pesenti | |
| 2005/0039963 | A1 | | 2/2005 | Forderhase | |
| 2013/0327171 | A1 | * | 12/2013 | Shu et al. | ..................... 74/337.5 |

* cited by examiner

*Primary Examiner* — Joseph Rocca
*Assistant Examiner* — Marlon Arce
(74) *Attorney, Agent, or Firm* — Joseph T. Leone, Esq.; DeWitt Ross & Stevens S.S.C.

(57) ABSTRACT

A transmission assembly for a human- and/or motor-powered vehicle, including a hollow transfer shaft, first and second inner one-way needle bearings, the first inner one-way needle bearing disposed within a first hollow end of the transfer shaft, and the second inner one-way needle bearing disposed within a second hollow end of the transfer shaft; and a first and a second outer one-way needle bearings, each having an inner diameter and an outer diameter, the first outer one-way needle bearing disposed about the outer diameter of the transfer shaft near the first hollow end of the transfer shaft, and the second outer one-way needle bearing disposed about the outer diameter of the transfer shaft near the second end of the transfer shaft, such that the inner diameter of each of the first and second outer one-way needle bearings contacts the outer diameter of the transfer shaft.

12 Claims, 4 Drawing Sheets

TRANSMISSION ASSEMBLY FEATURING ONE-WAY NEEDLE BEARINGS FOR ENGINE- AND HUMAN-POWERED VEHICLES

FIELD OF THE INVENTION

The device disclosed and claimed herein is directed to a transmission assembly for vehicles that can be powered by both an engine and by human power, such as a motorized bicycle.

BACKGROUND

Motorized bicycles are known in the art. See, for example, U.S. Pat. No. 4,397,369, to Read; U.S. Pat. No. 5,361,863, to Goodwin; U.S. Pat. No. 7,284,463, to Rizzetto; U.S. Pat. No. 7,770,682, to Spanski; U.S. Pat. No. 8,051,937, to Pesenti; and Published Pat. Appl. US 2005/0039963, to Forderhase. A significant drawback to these designs is that they are heavy and overly complicated. Because of their weight, they are not practically operable by human power alone. Thus, they are not bicycles in the truest sense of being operable over any appreciably long distance via the leg-power of the rider. They are more akin to motorcycles and designed to be powered exclusively (or very nearly so) by the affixed engine. Because the transmission assembly that links the engine to the geartrain that drives the wheels is complicated, the prior designs are difficult to manufacture and cannot be easily implemented into existing assembly lines for making conventional bicycles or other human-powered vehicles (tricycles, 4-wheelers, etc.). Thus, there remains a long-felt and unmet need for a lightweight transmission of a design that enables a vehicle to be powered with equal facility either by the human rider or by an engine.

SUMMARY OF THE INVENTION

Disclosed is a transmission assembly comprising a hollow transfer shaft 20 having an inner diameter, an outer diameter, and defining a first hollow end, and a second hollow end; a first (22) and a second (22') inner one-way needle bearings each having an inner diameter and an outer diameter, the first inner one-way needle bearing disposed within the first hollow end of the transfer shaft, and the second inner one-way needle bearing disposed within the second hollow end of the transfer shaft, such that the outer diameter of each of the first (22) and second (22') inner one-way needle bearings contacts the respective inner diameter 25, 25' of the transfer shaft; and a first and a second outer one-way needle bearings, 25 and 25', each having an inner diameter and an outer diameter, the first outer one-way needle bearing disposed about the outer diameter of the transfer shaft near the first hollow end of the transfer shaft, and the second outer one-way needle bearing disposed about the outer diameter of the transfer shaft near the second end of the transfer shaft, such that the inner diameter of each of the first and second outer one-way needle bearings contacts the outer diameter of the transfer shaft.

In one version of the transmission assembly, wherein the inner diameter of each of the first and second inner one-way needle bearings 22 and 22' respectively is dimensioned and configured to contact an outer surface of a spindle 14 of a human-powered vehicle. The spindle 14 may be the spindle of a bicycle. The outer diameter of each of the first and second outer one-way needle bearings 24 and 24' may be dimensioned and configured to contact an inner diameter of a bottom bracket shell 15 of a human-powered vehicle, such as a bicycle as shown in FIG. 4.

The transmission assembly may further comprise a first side thrust bearing 23 disposed around the outer diameter of the transfer shaft at the first hollow end of the transfer shaft and in contact with the first outer one-way needle bearing 24; and a second side thrust bearing 23' disposed around the outer diameter of the transfer shaft at the second hollow end of the transfer shaft and in contact with the second outer one-way needle bearing 24'.

In another version, the transmission assembly comprises a spindle 14 having an outer diameter, a first end 13, and a second end 13', wherein the spindle is disposed within the hollow transfer shaft, and wherein the outer diameter of the spindle contacts the inner diameter of each of the first and second inner, one-way needle bearings, 22 and 22'.

The transmission assembly may comprise a first drive plate 34 attached near the first end 13 of the spindle and a second drive plate 32 attached near the second end 13' of the spindle. The transmission assembly may further comprise a motor sprocket 36 attached to the first drive plate 34. The transmission assembly may further comprise at least one chain ring 16 attached to the second drive plate 32.

In yet another version of the transmission assembly, it may further include a first side thrust bearing 28 disposed around and in contact with the outer diameter of the spindle 14 at a point closer to the first end 13 of the spindle than the first drive plate 34; and a second side thrust bearing 28' disposed around and in contact with the outer diameter of the spindle 14 at a point closer to the second end 13' of the spindle than the second drive plate 32, wherein the first and second side thrust bearings, 28 and 28' are biased toward one another.

In yet another version, the transmission assembly comprises a hollow transfer shaft 20 having an inner diameter, an outer diameter, and defining a first hollow end, and a second hollow end; a first 22 and a second 22' inner one-way needle bearings, each having an inner diameter and an outer diameter, the first inner one-way needle bearing 22 disposed within the first hollow end 25 of the transfer shaft, and the second inner one-way needle bearing 22' disposed within the second hollow end 25' of the transfer shaft, such that the outer diameter of each of the first and second inner one-way needle bearings contacts the inner diameter of the transfer shaft; a first 24 and a second 24' outer one-way needle bearings, each having an inner diameter and an outer diameter, the first outer one-way needle bearing 24 disposed about the outer diameter of the transfer shaft near the first hollow end of the transfer shaft, and the second outer one-way needle bearing 24' disposed about the outer diameter of the transfer shaft near the second end of the transfer shaft, such that the inner diameter of each of the first and second outer one-way needle bearings contacts the outer diameter of the transfer shaft; and a spindle 14 having an outer diameter, a first end 13, and a second end 13', wherein the spindle is disposed within the hollow transfer shaft 20, and wherein the outer diameter of the spindle contacts the inner diameter of each of the first and second inner, one-way needle bearings, 22 and 22', respectively.

DETAILED DESCRIPTION

Figure 1:
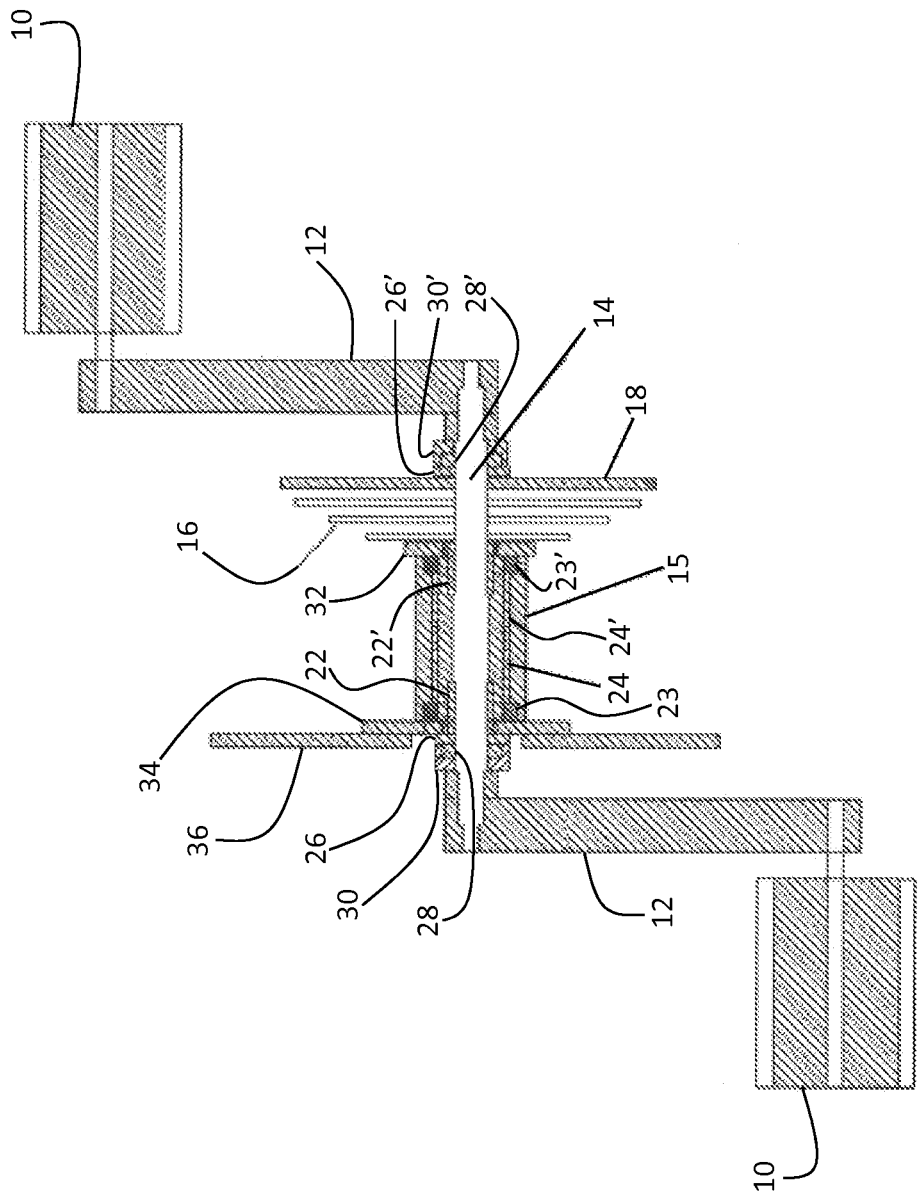
FIG. 1 is a front elevation, cross-sectional view of a transmission assembly as disclosed and claimed herein.

The same reference numerals are used throughout the four drawings.

Depicted in FIG. 1 is the subject transmission assembly in the context of a conventional bicycle transmission designed to be powered by a human rider. Thus, depicted in FIG. 1 are conventional pedals 10, crank arms 12, and a spindle 14 passing through a bicycle bottom bracket shell 15. As shown in FIG. 1, the spindle 14 passes through the bottom bracket shell 15 and connects the end of each the crank arm 12 that is opposite to its respective pedal 10. The spindle 14 has first hollow end 13 and a second hollow end 13' at either end (see FIG. 2) to allow the crank arms 12 to be reversibly attached to the spindle 14 via bolts (not shown). Disposed about the spindle 14 are conventional chain rings 16 (three are shown; there may be more or less than three) and a chain guard 18.

Figure 2:
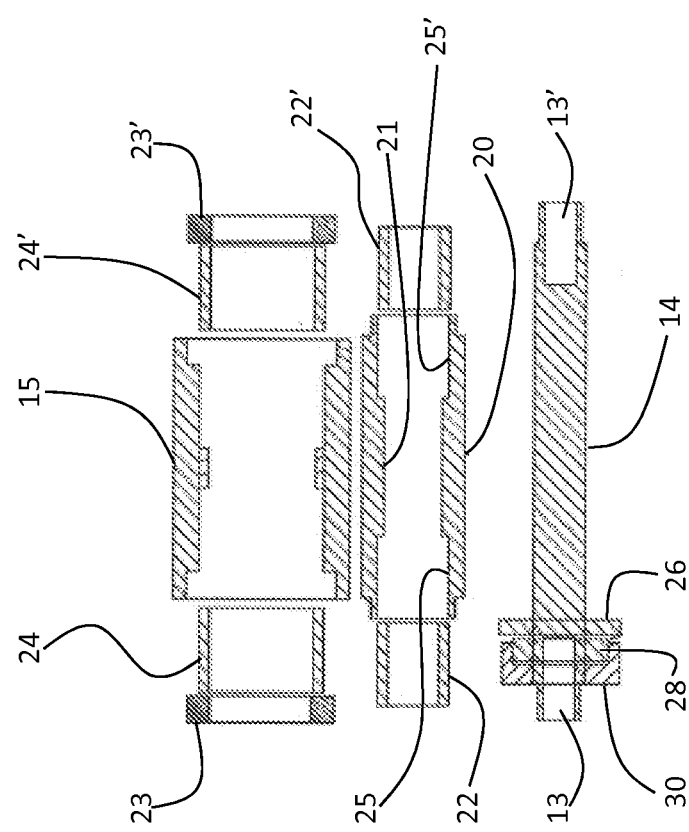
FIG. 2 is an isolated, front elevation, cross-sectional, exploded view of the bottom bracket shell 15 of a bicycle, with transfer shaft 20, inner one-way needle bearings 22, and outer one-way needle bearings 24, as shown in FIG. 1.
Figure 4:
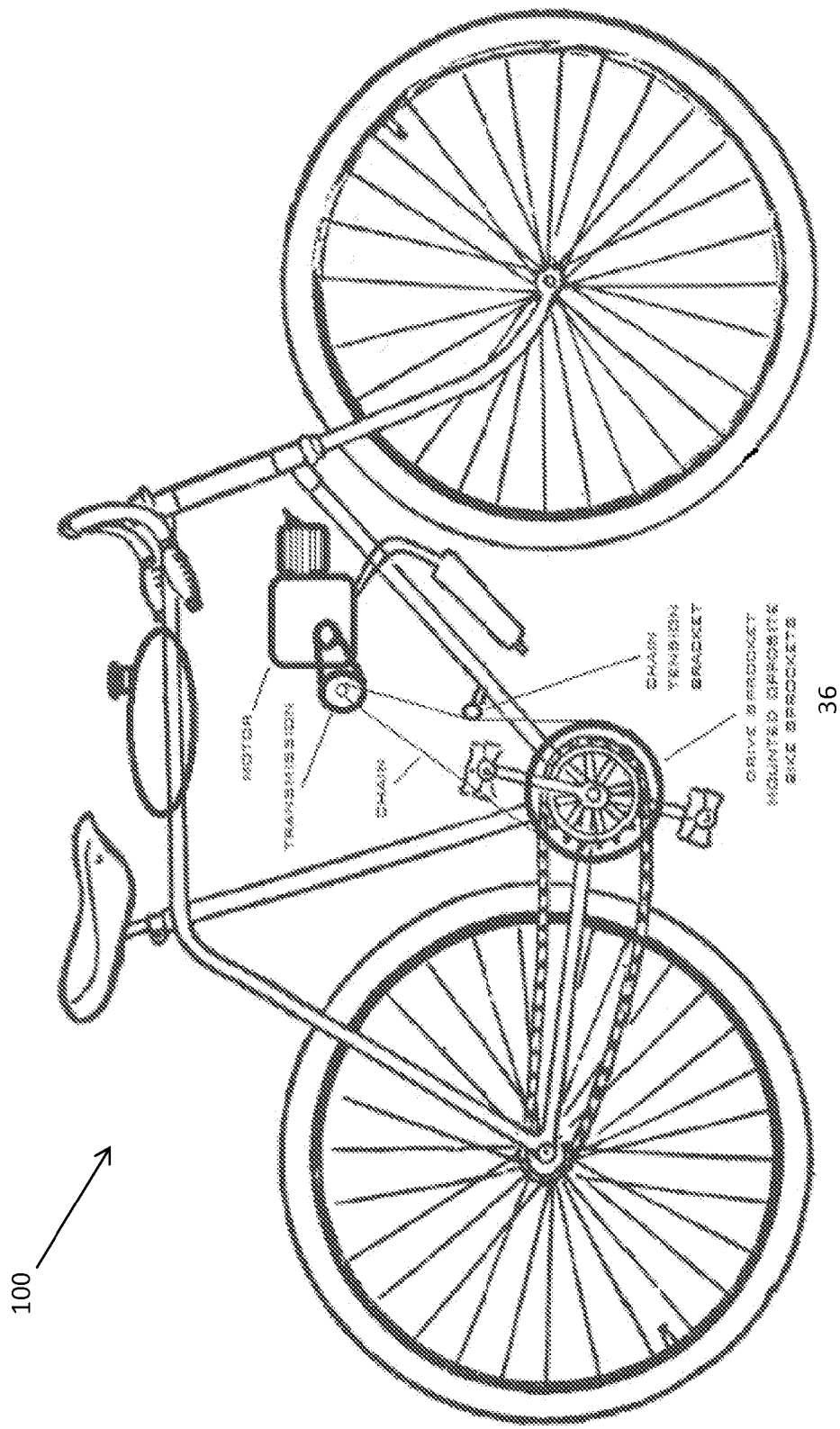
FIG. 4 depicts a bicycle having a motor attached thereto and linked to the subject transmission assembly via a chain that attaches to motor sprocket 36 as shown in FIG. 1.

Referring simultaneously to FIGS. 1 and 2, in the present transmission, the convention bottom bracket (not shown) is replaced with a transmission assembly that enables the vehicle (in the case of FIG. 4, which is exemplary, a bicycle) to be powered by the human rider, by an on-board engine or other power source (depicted in FIG. 4), or by both (the rider assisted by the engine). The on-board motor, engine, prime mover, etc. depicted in FIG. 4 is conventional and will not be described in any detail herein. Suitable engines of many different designs are available commercially. Any such engine or prime mover, of any configuration (single- or multiple piston; straight-, V-, opposed pistons, etc., Wankel-style rotary, etc.) or energy source (electrical, gasoline, diesel, solar, etc.) may be used. As shown in FIGS. 1 and 2, a hollow transfer shaft 20 having an inner and outer diameter is positioned around the spindle 14, within the bottom bracket shell 15. The transfer shaft 20 includes an inner diameter flange 21 that defines first and second outer regions or ends 25 and 25' whose inner diameter is larger than the inner diameter about the flange 21. First and second inner one-way needle bearings 22 and 22' respectively fit sleeve-like into the outer regions 25 and 25' defined at either end of the transfer shaft 20 and contact the spindle 14. The inner one-way needle bearings 22 and 22' are "one way" in that they rotate freely in only one direction. The inner one-way needle bearings 22 and 22' are oriented to allow the vehicle to be human-powered via the pedals 10 and crank arms 12, and also for the pedals to "free wheel" when the vehicle is coasting or at any time when the spindle 14 is rotating faster than the pedals 10 and crank arms 12 are being rotated.

A first and second outer one-way needle bearings 24 and 24', respectively, are positioned about the outer diameter of the transfer shaft 20. The outer one-way needle bearings 24 and 24' are held in place within the bottom bracket shell 15 via corresponding first and second side thrust bearings 23 and 23'. In the same fashion as the inner one-way needle bearings 22 and 22', the outer one-way needle bearings 24 and 24' are "one way" in that they rotate freely in only one direction. The outer one-way needle bearings 24 and 24' are oriented to allow the vehicle to be powered by the onboard motor depicted in FIG. 4, yet simultaneously to permit the pedals 10 and crank arms 12 to "free wheel." In this fashion, a rider can either pedal the vehicle in conventional fashion, or leave the pedals stationary and allow the vehicle to be powered by the onboard engine, or a combination of the two; that is, to allow the onboard engine to assist the rider in pedaling the vehicle.

Figure 3:
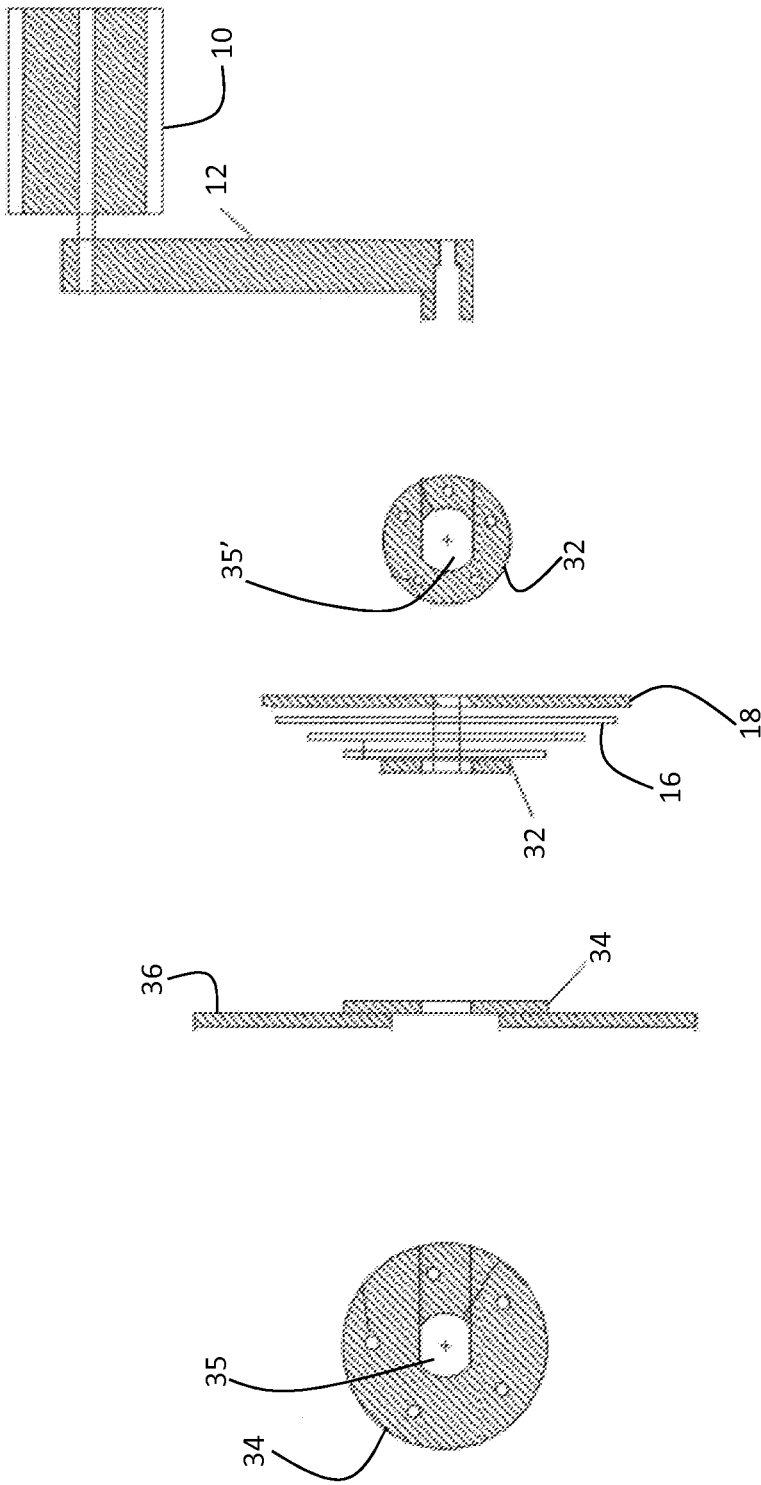
FIG. 3 is an isolated, front elevation, cross-sectional, exploded view of drive plates 32 and 34 and motor sprocket 36 as shown in FIG. 1.

Referring now to FIGS. 1, 2, and 3, power is supplied from the engine to the vehicle via a motor sprocket 36, which in turn is connected to a first drive plate 34 via a plurality of sprocket bolt holes or any other suitable connectors (see FIG. 3). The first drive plate 34 defines an eccentric, keyed, or otherwise non-circular aperture 35 that engages one end of the spindle 14 via the first inner-one-way needle bearing 22. At the other end of the spindle, the conventional chain rings are attached to a second drive plate 32. The second drive plate 32 also defines an eccentric, keyed, or otherwise non-circular aperture 35' that engages the other end of the spindle 14 via the second inner-one-way needle bearing 22'.

The entire collection of parts positioned within the bottom bracket shell 15, as well as the chain guard 18, chain rings 16, drive plates 32 and 34, and the motor sprocket 36 attached to drive plate 34 are held in place with respect to the bottom bracket shell 15 via a paired set of washers 26 and 26', outer side thrust bearings 28 and 28', and bearing housings 30 and 30'. (One set of washer 26, outer side thrust bearing 28, and bearing housing 30 is shown in FIG. 2. Both sets are shown in FIG. 1.) These two sets (26, 28, 30 and 26', 28', and 30') are biased toward one another along the axis of the spindle 14.

In this fashion, both the motor sprocket 36 and the conventional chain rings 16 are attached to the spindle 14 in such a fashion that the vehicle can be powered by the motor shown in FIG. 4, or by human power transferred to the spindle 14 via the pedals 10 and crank arms 12. The inner one-way needle bearings 22 and 22' and outer one-way needle bearings 24 and 24' are oriented in such a fashion that the spindle 14 can be rotated via energy transferred from the motor via motor sprocket 36 and first drive plate 34 and/or via energy transferred by the rider via pedals 10, crank arms 12, chain rings 16, and second drive plate 32. In other words, the inner one-way needle bearings 22 and 22' cooperate with the outer one-way needle bearings 24 and 24' to enable the spindle 14 and the crank arms 12 and pedals 10 to free wheel when the spindle rotates faster than the crank arms and pedals are rotating.

Specifically referring to FIG. 3, the figure depicts the first drive plate 34 and the second drive plate 32, both in isolation and in association with motor sprocket 36 in the case of first drive plate 34 and in association with the chain rings 16 in the case of second drive plate 32. Exemplary dimensions are included in FIG. 3 for purposes of illustration only.

In FIG. 4 is depicted a conventional bicycle having a motor or prime mover attached thereto, along with a conventional transmission and a connector to connect the motor to the motor sprocket 36. In this fashion, the bicycle depicted in FIG. 4 can be powered by a human rider by pushing the pedals 10 or the bicycle can be powered via the motor or the motor can be used to assist a rider in powering the bicycle.

What is claimed is:

1. A transmission assembly comprising:
a hollow transfer shaft having an inner diameter, an outer diameter, and defining a first hollow end, and a second hollow end;
a first and a second inner one-way needle bearings, each having an inner diameter and an outer diameter, the first inner one-way needle bearing disposed within the first hollow end of the transfer shaft, and the second inner one-way needle bearing disposed within the second hollow end of the transfer shaft, such that the outer diameter of each of the first and second inner one-way needle bearings contacts the inner diameter of the transfer shaft; and a first and a second outer one-way needle bearings, each having an inner diameter and an outer diameter, the first outer one-way needle bearing disposed about the outer diameter of the transfer shaft near the first hollow end of the transfer shaft, and the second outer one-way needle bearing disposed about the outer diameter of the transfer shaft near the second end of the transfer shaft, such that the inner diameter of each of the first and second outer one-way needle bearings contacts the outer diameter of the transfer shaft.

2. The transmission assembly of claim 1, wherein the inner diameter of each of the first and second inner one-way needle bearings is dimensioned and configured to contact an outer surface of a spindle of a human-powered vehicle.

3. The transmission assembly of claim 1, wherein the inner diameter of each of the first and second inner one-way needle bearings is dimensioned and configured to contact an outer surface of a spindle of a bicycle.

4. The transmission assembly of claim 1, wherein the outer diameter of each of the first and second outer one-way needle bearings is dimensioned and configured to contact an inner diameter of a bottom bracket shell of a human-powered vehicle.

5. The transmission assembly of claim 1, wherein the outer diameter of each of the first and second outer one-way needle bearings is dimensioned and configured to contact an inner diameter of a bottom bracket shell of a bicycle.

6. A transmission assembly comprising:
a hollow transfer shaft having an inner diameter, an outer diameter, and defining a first hollow end, and a second hollow end;
a first and a second inner one-way needle bearings, each having an inner diameter and an outer diameter, the first inner one-way needle bearing disposed within the first hollow end of the transfer shaft, and the second inner one-way needle bearing disposed within the second hollow end of the transfer shaft, such that the outer diameter of each of the first and second inner one-way needle bearings contacts the inner diameter of the transfer shaft; and
a first and a second outer one-way needle bearings, each having an inner diameter and an outer diameter, the first outer one-way needle bearing disposed about the outer diameter of the transfer shaft near the first hollow end of the transfer shaft, and the second outer one-way needle bearing disposed about the outer diameter of the transfer shaft near the second end of the transfer shaft, such that the inner diameter of each of the first and second outer one-way needle bearings contacts the outer diameter of the transfer shaft; and
further comprising a first side thrust bearing disposed around the outer diameter of the transfer shaft at the first hollow end of the transfer shaft and in contact with the first outer one-way needle bearing; and a second side thrust bearing disposed around the outer diameter of the transfer shaft at the second hollow end of the transfer shaft and in contact with the second outer one-way needle bearing;
wherein the outer diameter of each of the first and second outer one-way needle bearings is dimensioned and configured to contact an inner diameter of a bottom bracket shell of a bicycle.

7. A transmission assembly comprising:
a hollow transfer shaft having an inner diameter, an outer diameter, and defining a first hollow end, and a second hollow end;
a first and a second inner one-way needle bearings, each having an inner diameter and an outer diameter, the first inner one-way needle bearing disposed within the first hollow end of the transfer shaft, and the second inner one-way needle bearing disposed within the second hollow end of the transfer shaft, such that the outer diameter of each of the first and second inner one-way needle bearings contacts the inner diameter of the transfer shaft; and
a first and a second outer one-way needle bearings, each having an inner diameter and an outer diameter, the first outer one-way needle bearing disposed about the outer diameter of the transfer shaft near the first hollow end of the transfer shaft, and the second outer one-way needle bearing disposed about the outer diameter of the transfer shaft near the second end of the transfer shaft, such that the inner diameter of each of the first and second outer one-way needle bearings contacts the outer diameter of the transfer shaft;
a spindle having an outer diameter, a first end, and a second end, wherein the spindle is disposed within the hollow transfer shaft, and wherein the outer diameter of the spindle contacts the inner diameter of each of the first and second inner, one-way needle bearings;
a first drive plate attached near the first end of the spindle and a second drive plate attached near the second end of the spindle;
a motor sprocket attached to the first drive plate; and
further comprising a first side thrust bearing disposed around and in contact with the outer diameter of the spindle at a point closer to the first end of the spindle than the first drive plate; and a second side thrust bearing disposed around and in contact with the outer diameter of the spindle at a point closer to the second end of the spindle than the second drive plate, wherein the first and second side thrust bearings are biased toward one another.

8. A transmission assembly comprising:
a hollow transfer shaft having an inner diameter, an outer diameter, and defining a first hollow end, and a second hollow end;
a first and a second inner one-way needle bearings, each having an inner diameter and an outer diameter, the first inner one-way needle bearing disposed within the first hollow end of the transfer shaft, and the second inner one-way needle bearing disposed within the second hollow end of the transfer shaft, such that the outer diameter of each of the first and second inner one-way needle bearings contacts the inner diameter of the transfer shaft;
a first and a second outer one-way needle bearings, each having an inner diameter and an outer diameter, the first outer one-way needle bearing disposed about the outer diameter of the transfer shaft near the first hollow end of the transfer shaft, and the second outer one-way needle bearing disposed about the outer diameter of the transfer shaft near the second end of the transfer shaft, such that the inner diameter of each of the first and second outer one-way needle bearings contacts the outer diameter of the transfer shaft; and
a spindle having an outer diameter, a first end, and a second end, wherein the spindle is disposed within the hollow transfer shaft, and wherein the outer diameter of the spindle contacts the inner diameter of each of the first and second inner, one-way needle bearings; and further comprising a first side thrust bearing disposed around the outer diameter of the transfer shaft at the first hollow end of the transfer shaft and in contact with the first outer one-way needle bearing; and a second side thrust bearing disposed around the outer diameter of the transfer shaft at the second hollow end of the transfer shaft and in contact with the second outer one-way needle bearing.

9. The transmission assembly of claim 8, further comprising a first drive plate attached near the first end of the spindle and a second drive plate attached near the second end of the spindle.

10. The transmission assembly of claim 9, further comprising a motor sprocket attached to the first drive plate.

11. The transmission assembly of claim 10, further comprising at least one chain ring attached to the second drive plate.

12. The transmission assembly of claim 11, further comprising a first side thrust bearing disposed around and in contact with the outer diameter of the spindle at a point closer to the first end of the spindle than the first drive plate; and a second side thrust bearing disposed around and in contact with the outer diameter of the spindle at a point closer to the second end of the spindle than the second drive plate, wherein the first and second side thrust bearings are biased toward one another.

* * * * *